United States Patent
Kigami

(10) Patent No.: US 12,214,575 B2
(45) Date of Patent: Feb. 4, 2025

(54) MEMBER SUPPLYING SHEET

(71) Applicant: NITTO DENKO CORPORATION, Osaka (JP)

(72) Inventor: Hiroki Kigami, Osaka (JP)

(73) Assignee: NITTO DENKO CORPORATION, Osaka (JP)

(*) Notice: Subject to any disclaimer, the term of this patent is extended or adjusted under 35 U.S.C. 154(b) by 108 days.

(21) Appl. No.: 17/790,851

(22) PCT Filed: Jan. 8, 2021

(86) PCT No.: PCT/JP2021/000562
§ 371 (c)(1),
(2) Date: Jul. 5, 2022

(87) PCT Pub. No.: WO2021/141124
PCT Pub. Date: Jul. 15, 2021

(65) Prior Publication Data
US 2023/0045951 A1 Feb. 16, 2023

(30) Foreign Application Priority Data
Jan. 9, 2020 (JP) .................................. 2020-002006

(51) Int. Cl.
*B32B 27/32* (2006.01)
*B32B 3/08* (2006.01)
(Continued)

(52) U.S. Cl.
CPC ............ *B32B 27/322* (2013.01); *B32B 3/085* (2013.01); *B32B 7/12* (2013.01); *B32B 27/30* (2013.01); *B32B 2307/54* (2013.01)

(58) Field of Classification Search
CPC .... H04R 1/023; H04R 1/086; H04R 2499/11; H04R 1/44; H04R 1/00; H04R 1/02;
(Continued)

(56) References Cited

U.S. PATENT DOCUMENTS 6,355,322 B1 * 3/2002 Golledge ................ B32B 15/20
428/40.9
2005/0074606 A1 4/2005 Nishiyama et al.
(Continued)

FOREIGN PATENT DOCUMENTS

CN 102100083 A 6/2011
JP 62-58638 A 3/1987
(Continued)

OTHER PUBLICATIONS

International Search Report issued in International Patent Application No. PCT/JP2021/000562, dated Mar. 2, 2021, along with an English translation thereof.
(Continued)

*Primary Examiner* — Alicia J Weydemeyer
(74) *Attorney, Agent, or Firm* — GREENBLUM & BERNSTEIN, P.L.C.

(57) ABSTRACT

A member supplying sheet provided includes: a protective cover member configured to be placed on a face of an object to prevent a foreign matter from entering an opening of the face; and a substrate sheet having a surface where the protective cover member is placed. The protective cover member includes a laminate including: a protective membrane having a shape configured to cover the opening when the protective cover member is placed on the face; and an adhesive layer. The protective cover member is placed on the surface of the substrate sheet via the adhesive layer. The member supplying sheet is suitable for supplying the protective cover member to a device that picks up the protective cover member in a state where the substrate sheet is pushed up from a back side of the substrate sheet, the back side being opposite to the surface.

10 Claims, 12 Drawing Sheets

(51) Int. Cl.
  *B32B 7/12* (2006.01)
  *B32B 27/30* (2006.01)

(58) Field of Classification Search
  CPC .............. H04R 1/1016; H04R 2207/00; H04R 25/654; H04R 25/658; H04R 7/04; H04R 1/20; H04R 1/22; H04R 1/32
  See application file for complete search history.

(56) References Cited

U.S. PATENT DOCUMENTS

| | | | |
|---|---|---|---|
| 2010/0206660 A1* | 8/2010 | Horie | B32B 27/06 181/175 |
| 2011/0117304 A1* | 5/2011 | Ueki | H04R 1/023 156/247 |
| 2011/0168022 A1 | 7/2011 | Furuyama | |
| 2011/0237050 A1 | 9/2011 | Sugimura et al. | |
| 2015/0050432 A1* | 2/2015 | Ooga | C08C 19/38 428/1.54 |

FOREIGN PATENT DOCUMENTS

| | | |
|---|---|---|
| JP | 1-42983 B2 | 9/1989 |
| JP | 3-19268 B2 | 3/1991 |
| JP | 2003-313516 A | 11/2003 |
| JP | 2005-105212 A | 4/2005 |
| JP | 2011-204806 A | 10/2011 |
| WO | 2010/140402 A1 | 12/2010 |

OTHER PUBLICATIONS

Office Action issued in Chinese Patent Appl. No. 202180002485.6, dated Mar. 21, 2022, along with an English translation thereof.

* cited by examiner

MEMBER SUPPLYING SHEET

TECHNICAL FIELD

The present invention relates to a member supplying sheet for supplying a protective cover member configured to be placed on a face of an object to prevent a foreign matter from entering an opening of the face.

BACKGROUND ART

Protective cover members configured to be placed on a face of an object to prevent a foreign matter from entering an opening of the face are known. A protective cover member can be supplied in the form of a member supplying sheet in which the member is placed on a substrate sheet. Patent Literature 1 discloses a filter-holding object including a substrate sheet (carrier tape) extending in a given direction and a plurality of gas-permeable filters held and arranged in the given direction on the carrier tape. The filter-holding object of Patent Literature 1 is suitable, in the form of a reel wound around a winding core, for supplying the gas-permeable filter. FIG. 1 shows a typical embodiment of supplying a gas-permeable filter using a reel. A filter-holding object 52 drawn from a reel 51A is conveyed along a knife-edge-shaped peeling table 54 and turns back at an edge 55 located at the end of the peeling table 54. When the filter-holding object 52 turns back, a gas-permeable filter 53 peels off a carrier tape 56 by itself and is picked up by a suction nozzle 57. The gas-permeable filter 53 picked up is conveyed by the suction nozzle 57 and placed on a surface 60 to cover an opening 59 of an object 58. After the peeling, the carrier tape 56 is collected by a take-up roll 51B.

CITATION LIST

Patent Literature

Patent Literature 1: WO 2010/140402 A

SUMMARY OF INVENTION

Technical Problem

Recently, there is a demand for placement of a protective cover member over an opening of a tiny product such as a micro electro mechanical system (hereinafter referred to as "MEMS"). As one response to the demand, application, to pickup of a protective cover member, of a device for picking up a semiconductor device by pushing it up has been discussed in order to improve the efficiency of placement of the protective cover member in a manufacturing process of the above products. The device is expected to pick up a protective cover member 62 by, for example, the suction nozzle 57 in a state where a substrate sheet 61 is pushed up using a push-up indenter 64 from a back side of the substrate sheet 61, the back side being opposite to a placement face 63 where the protective cover member 62 is placed (in this state, the protective cover member 62 is partially peeled off the substrate sheet 61) (refer to FIG. 2). A study by the present inventors has revealed that the larger a pushup amount d of the substrate sheet 61 is, the better the pickup performance is exhibited for the protective cover member 62. However, the pushup amount d is required to be decreased in order to shorten the pickup time and improve the efficiency of placement.

The present invention aims to provide a member supplying sheet, the member supplying sheet being for protective cover member supply and including: a protective cover member; and a substrate sheet having a surface where the protective cover member is placed, the member supplying sheet being suitable for supplying the protective cover member to a pickup device (hereinafter referred to as "pushup-pickup device") that picks up the protective cover member from the substrate sheet in a state where the substrate sheet is pushed up from a back side of the substrate sheet, the back side being opposite to the surface.

Solution to Problem

The present invention provides a member supplying sheet, the member supplying sheet being for protective cover member supply and including:
  one or more protective cover members each configured to be placed on a face of an object to prevent a foreign matter from entering an opening of the face; and
  a substrate sheet having a surface where the one or more protective cover members are placed, wherein
  the protective cover member includes a laminate including: a protective membrane having a shape configured to cover the opening when the protective cover member is placed on the face; and an adhesive layer,
  the protective cover member is placed on the surface of the substrate sheet via the adhesive layer, and
  the substrate sheet has the following property A and property B:
  A: a tensile stress at 10% stretching in a tensile test is 15 N/5 mm or less in at least one in-plane direction; and
  B: a peel force of the surface is 0.4 N/50 mm or less, the peel force being evaluated by a peel test in which the substrate sheet adhered to an adhesive tape via the surface is peeled off at 180° with respect to the adhesive tape.

Advantageous Effects of Invention

In the member supplying sheet of the present invention, the tensile stress of the substrate sheet is equal to or less than the given value in at least one in-plane direction. According to a study by the present inventors, even in the case of a small pushup amount d, this substrate sheet can greatly deform in the at least one direction because of its excellent stretchability and flexibility exhibited at pushup. Therefore, even in the above case, an amount of pushup-caused partial peeling of the protective cover member 62 can be still secured (refer to FIGS. 3A and 3B: FIG. 3A shows a pushup state of the substrate sheet 61 having a relatively large tensile stress, while FIG. 3B shows a pushup state of the substrate sheet 61 having a relatively small tensile stress. In FIG. 3B, although the pushup amount d is smaller than in FIG. 3A, the substrate sheet 61 greatly deforms, and thus the amount of partial peeling of the protective cover member 62 is still secured). Moreover, since a placement face of the substrate sheet 61 where the protective cover member 62 is placed has a peel force equal to or less than the given value, the pushup-caused partial peeling and eventual peeling of the protective cover member 62 in subsequent pickup are carried out smoothly and steadily. Therefore, the member supplying sheet of the present invention is suitable for supplying the protective cover member to a pushup-pickup device.

DESCRIPTION OF EMBODIMENTS

Hereinafter, embodiments of the present invention will be described with reference to the drawings. The present invention is not limited to the following embodiments.

Figure 1:
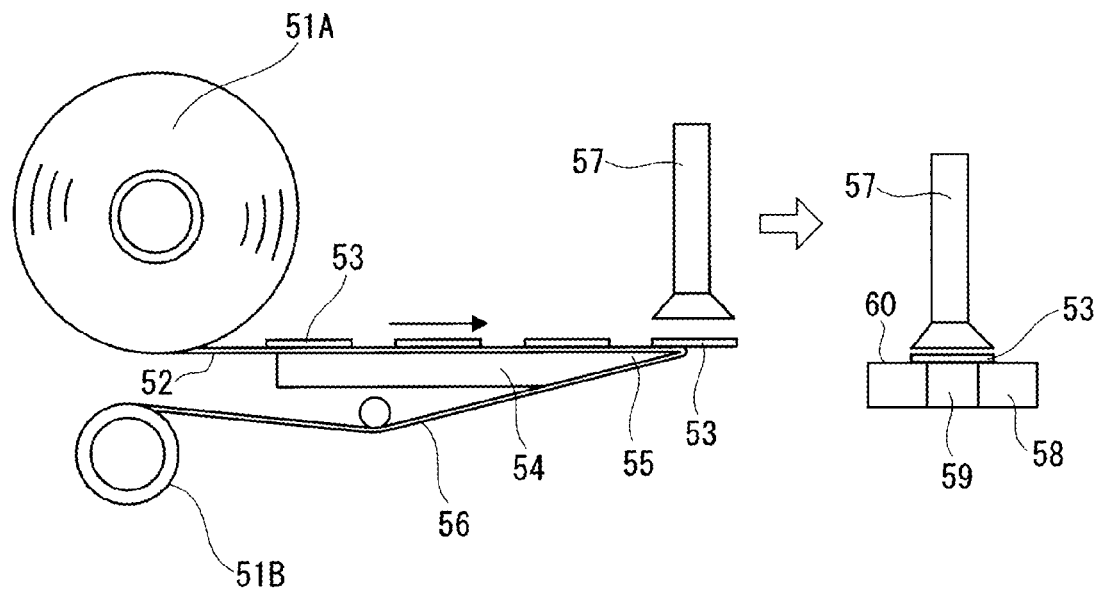
FIG. 1 is a schematic diagram showing a typical embodiment of supplying a gas-permeable filter using a filter-holding object of Patent Literature 1 in the form of a reel.
Figure 2:
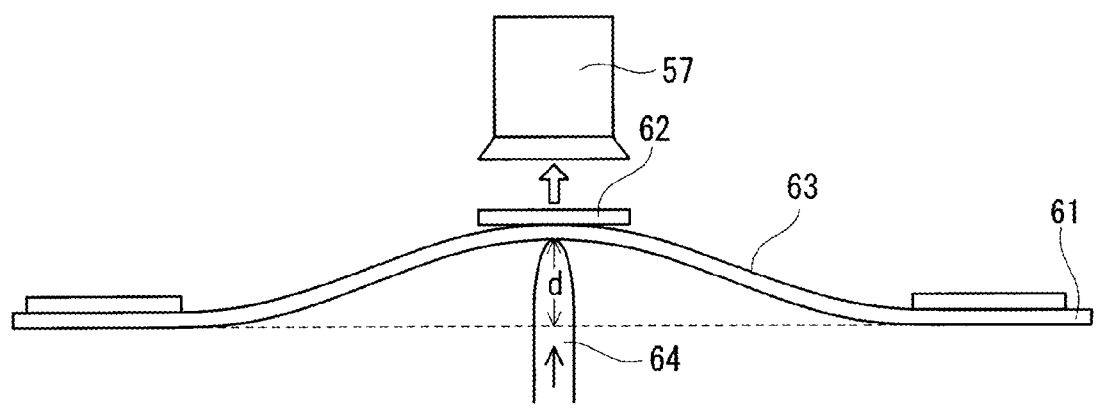
FIG. 2 is a schematic diagram illustrating pickup of a protective cover member using a pushup-pickup device.
Figure 3A:
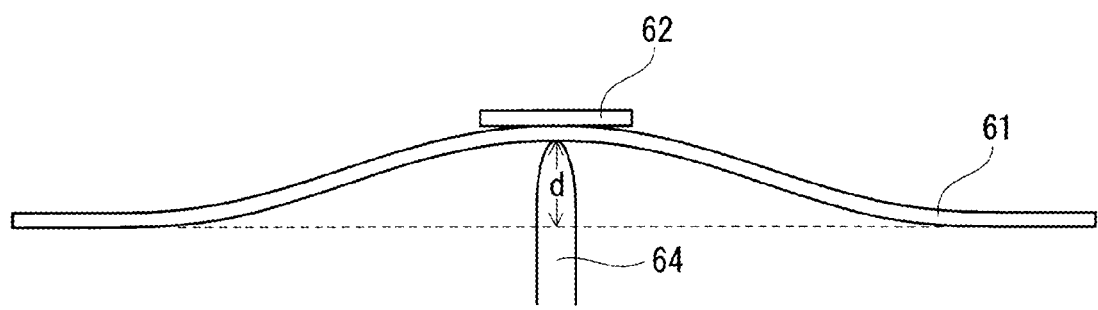
FIG. 3A is a schematic diagram illustrating the dependence of the state of a substrate sheet at pushup and the amount of partial peeling of a protective cover member from the substrate sheet on the tensile stress of the substrate sheet.
Figure 3B:
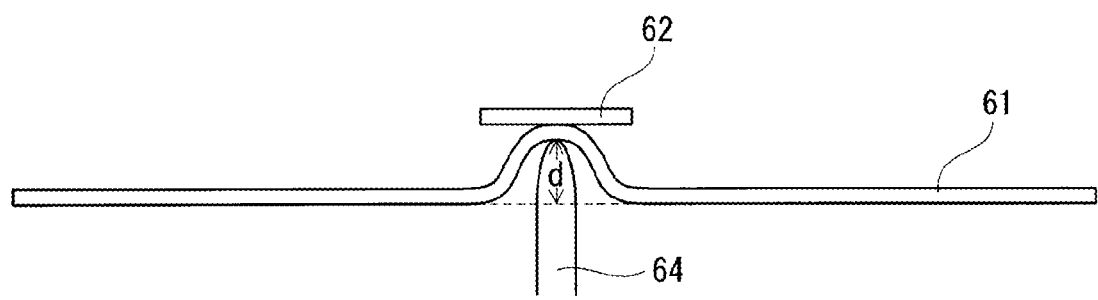
FIG. 3B is a schematic diagram illustrating the dependence of the state of a substrate sheet at pushup and the amount of partial peeling of a protective cover member from the substrate sheet on the tensile stress of the substrate sheet.
Figure 4A:
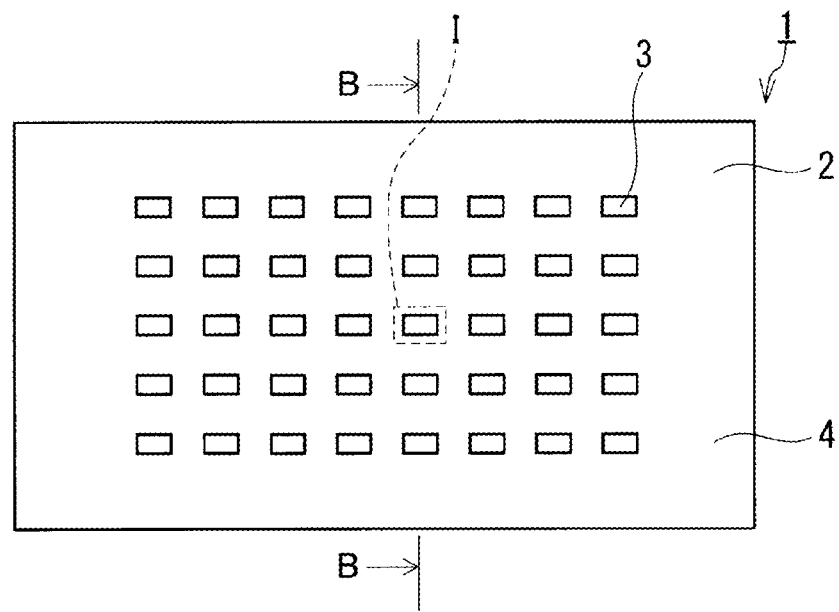
FIG. 4A is a plan view schematically showing an example of a member supplying sheet of the present invention.
Figure 4B:
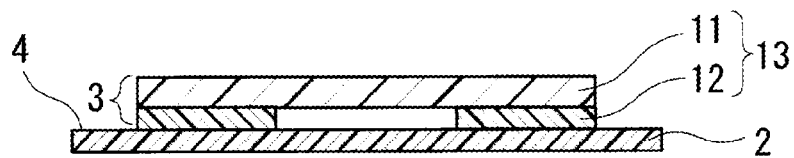
FIG. 4B is a cross-sectional view showing a cross-section B-B in a region I of the member supplying sheet of FIG. 4A.

FIGS. 4A and 4B show an example of a member supplying sheet of the present invention. FIG. 4B shows a cross-section B-B in a region I of the member supplying sheet 1 of FIG. 4A. The member supplying sheet 1 includes a substrate sheet 2 and a plurality of protective cover members 3 placed on a surface (placement face) 4 of the substrate sheet 2. The member supplying sheet 1 is a sheet for supplying the protective cover member 3. The protective cover member 3 is a member configured to be placed on a face of an object to prevent a foreign matter from entering an opening of the face. The protective cover member 3 includes a laminate 13 including a protective membrane 11 and an adhesive layer 12. The protective membrane 11 has a shape configured to cover the opening when the protective cover member 3 is placed on the face. In the example of FIG. 4B, the laminate 13 has a double-layered structure including the protective membrane 11 and the adhesive layer 12, and the protective membrane 11 and the adhesive layer 12 are joined together. The protective cover member 3 is placed on the surface 4 of the substrate sheet 2 via the adhesive layer 12.

For the substrate sheet 2, a tensile stress (property A; hereinafter referred to as "10% tensile stress") at 10% stretching in a tensile test is 15 N/5 mm or less in at least one in-plane direction. The 10% tensile stress may be 14.5 N/5 mm or less, 13.5 N/5 mm or less, 12.5 N/5 mm or less, 11 N/5 mm or less, 10 N/5 mm or less, 9.5 N/5 mm or less, 8.5 N/5 mm or less, 7.5 N/5 mm or less, 6 N/5 mm or less, or even 5 N/5 mm or less. The lower limit of the 10% tensile stress is, for example, 0.5 N/5 mm or more. For example, when the substrate sheet 2 is a stretched sheet, the value of the 10% tensile stress can differ depending on the direction of the tensile test. The substrate sheet 2 preferably has a 10% tensile stress in the above range in at least two or more in-plane directions, and more preferably has a 10% tensile stress in the above range in all in-plane directions. The substrate sheet 2 may have a 10% tensile stress in the above range in the MD and/or the TD, and may have a 10% tensile stress in the above range in the MD and the TD. When the substrate sheet 2 is in the form of a strip, the MD is generally a longitudinal direction and the TD is generally a width direction.

For the substrate sheet 2, a tensile elastic modulus (hereinafter referred to as "10% modulus") at 10% stretching in the tensile test may be 30 MPa or less in at least one in-plane direction, or may be 29 MPa or less, 27 MPa or less, 25 MPa or less, 22 MPa or less, 20 MPa or less, 19 MPa or less, 17 MPa or less, 15 MPa or less, 12 MPa or less, or even 10 MPa or less in at least one in-plane direction. The lower limit of the 10% modulus is, for example, 0.5 MPa or more. In this case, the substrate sheet 2 is more reliably deforms by pushup even when a pushup amount d is small. The substrate sheet 2 preferably has a 10% modulus in the above range in at least two or more in-plane directions, and more preferably has a 10% modulus in the above range in all in-plane directions. The substrate sheet 2 may have a 10% modulus in the above range in the MD and/or the TD, and may have a 10% modulus in the above range in the MD and the TD.

A test piece used in the tensile test is the shape of a No. 3 dumbbell defined in Japanese Industrial Standards (hereinafter referred to as "JIS") K 6251: 1993. Measurement conditions are as follows: gauge length of the test piece: 20 mm; initial chuck-to-chuck distance: 35 mm; tensile speed: 200 mm/min. A temperature of a measurement atmosphere was 25±10° C. and a humidity thereof is 50±10% RH. The tensile stress at 10% stretching and the tensile elastic modulus at 10% stretching respectively refer to a tensile stress and a tensile elastic modulus determined at a stretching rate of 10%, the stretching rate being determined by an expression $(L_1-L_0)/L_0 \times 100(\%)$, where $L_0$ is the chuck-to-chuck distance (initial chuck-to-chuck distance) before the test and $L_1$ is the chuck-to-chuck distance during the test.

For the substrate sheet 2, a peel force (property B) of the surface 4 is 0.4 N/50 mm or less, the peel force being evaluated by a peel test in which the substrate sheet 2 adhered to an adhesive tape via the surface 4 is peeled off at 180° with respect to the adhesive tape. The peel force may be 0.3 N/50 mm or less, 0.2 N/50 mm or less, 0.1 N/50 mm or less, 0.08 N/50 mm or less, or even 0.07 N/50 mm or less. The lower limit of the peel force is, for example, 0.01 N/50 mm or more.

Figure 5:
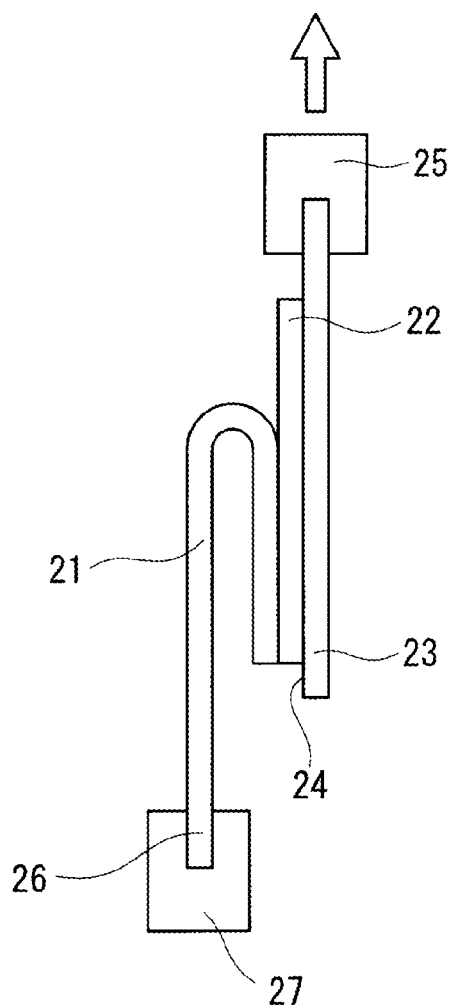
FIG. 5 is a schematic diagram illustrating a 180° peel test for determining a peel force of a placement face of a substrate sheet where a protective cover member is placed.

The peel test for determining the peel force will be described with reference to FIG. 5. The substrate sheet 2 to be evaluated is cut into a rectangular shape to obtain a test piece 21. The test piece 21 has a width of 50 mm or more. Next, a double-sided adhesive tape 22 having the same width as that of the test piece 21 is prepared and adhered to the test piece 21 such that two longitudinal sides of the test piece 21 coincide with those of the double-sided adhesive tape 22. For a higher measurement accuracy, a portion where the test piece 21 and the double-sided adhesive tape 22 are adhered preferably has a length of 120 mm or more. As the double-sided adhesive tape 22 is used AS-42PI50 manufactured by Nitto Denko Corporation. Each of adhesive layers of this double-sided adhesive tape is an acrylic adhesive layer and has an adhesive force of 15 N/20 mm, as expressed by a 180° peel adhesive force according to Testing Method 1 for adhesive force defined in JIS Z 0237: 2009 (refer to Items 10.3 and 10.4). In the case where the above double-sided adhesive tape is unavailable, a double-sided adhesive tape which has an equal adhesive force at at least an adhered surface to be adhered to the test piece 21 and whose adhesive layer on the adhered surface side is an acrylic adhesive layer can be used (an adhesive force of an adhered surface to be adhered to a later-described fixing plate 23 and the type of an adhesive layer thereof are not limited as long as peeling does not happen at the adhered surface during the test). The test piece 21 and double-sided adhesive tape 22 having a width of more than 50 mm are cut to a width of 50 mm after adhered to each other. Next, a stainless steel fixing plate 23 having a greater length and width than those of the test piece 21 and the double-sided adhesive tape 22 and being so thick that the fixing plate 23 does not deform during the test is prepared. The double-sided adhesive tape 22 is adhered to a surface 24 of the fixing plate 23. The double-sided adhesive tape 22 is adhered such that a whole exposed surface of the double-sided adhesive tape 22 is in contact with the surface 24. After that, a manual roller (defined in JIS Z 0237: 2009 and having a mass of 2 kg) for press-bonding the test piece 21, the double-sided adhesive tape 22, and the fixing plate 23 is moved back and forth once with the test piece 21 side down. Subsequently, one end of the fixing plate 23 is fixed to an upper chuck 25 of a tensile test apparatus, and an end portion 26 of the test piece 21 on the upper chuck 25 side is folded back at 180° to be fixed to a lower chuck 27 of the tensile test apparatus. Then, a 180° peel test is performed in which the test piece 21 is peeled off the double-sided adhesive tape 22. The tensile speed is 300 mm/min. For a higher measurement accuracy, measurement values for the first 20 mm length are ignored after the start of the test. Then, measurement values of the adhesive force for an at least 60 mm length peeled off the double-sided adhesive tape 22 are averaged, and the average is employed as a peel force (unit: N/50 mm) of the substrate sheet 2. The test is performed in an environment at a temperature of 20±10° C. and a humidity of 50±10% RH.

The member supplying sheet 1 can be used as a sheet for supplying the protective cover member 3 to a pushup-pickup device. However, where the protective cover member 3 is supplied using the member supplying sheet 1 is not limited to a pushup-pickup device. For example, the protective cover member 3 can be supplied to a pickup device other than a pushup-pickup device or to a step of picking up and using the protective cover member 3, for example, by hand or with tweezers. Examples of the pushup-pickup device include a chip mounter and a die bonder. However, the pushup-pickup device is not limited to the above example.

Figure 6:
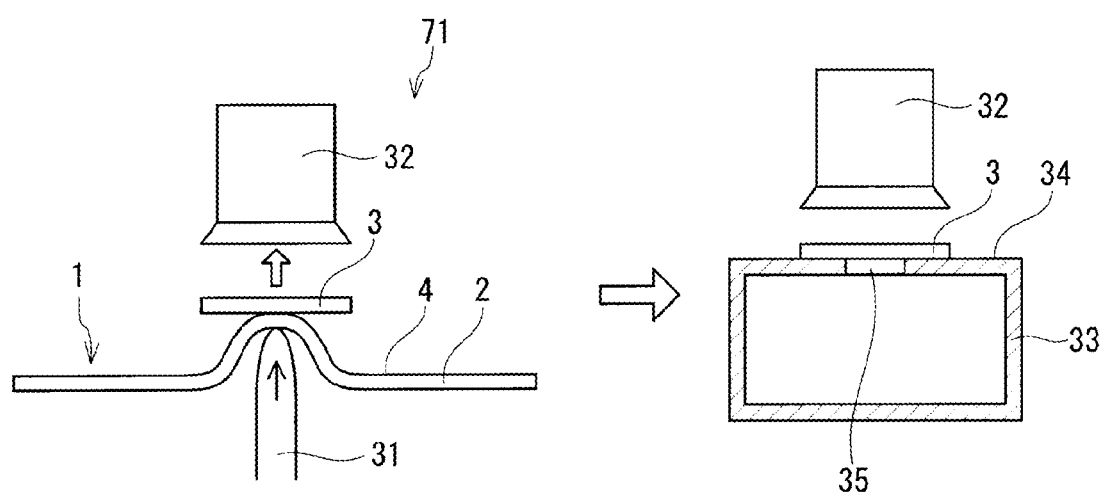
FIG. 6 is a schematic diagram showing one embodiment of supplying a protective cover member using the member supplying sheet of the present invention.

FIG. 6 shows an example of supplying the protective cover member 3 to a pushup-pickup device 71 using the member supplying sheet 1. As shown in FIG. 6, the member supplying sheet 1 supplied to the pushup-pickup device 71 is pushed up from a back side of the substrate sheet 2 by a push-up indenter 31 of the device at a position where the protective cover member 3 is placed, the back side being opposite to the surface 4. The pushup deforms the substrate sheet 2 upward to partially peel the protective cover member 3 from the substrate sheet 2. A peel face is located between the adhesive layer 12 of the protective cover member 3 and the substrate sheet 2. The pushup is preferably performed such that the substrate sheet 2 bends in an in-plane direction thereof in which the ranges of the 10% tensile stress and/or the 10% modulus are satisfied. In this state, the protective cover member 3 is picked up from the substrate sheet 2 by a pickup portion 32 such as a suction nozzle. The picked up protective cover member 3 can be, for example, conveyed by the pickup portion 32 and placed on a face 34 of an object 33, the face 34 having an opening 35. The protective cover member 3 can be placed, for example, such that the adhesive layer 12 is in contact with the face 34.

Figure 7A:
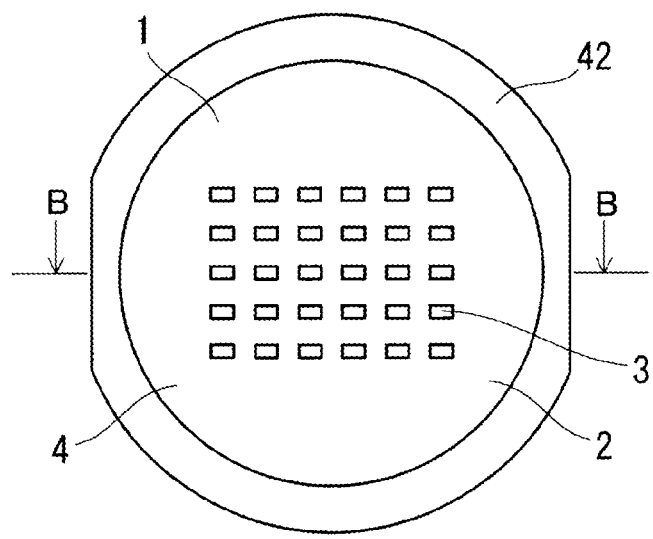
FIG. 7A is a schematic plan view illustrating one embodiment of supplying a protective cover member using the member supplying sheet of the present invention.
Figure 7B:
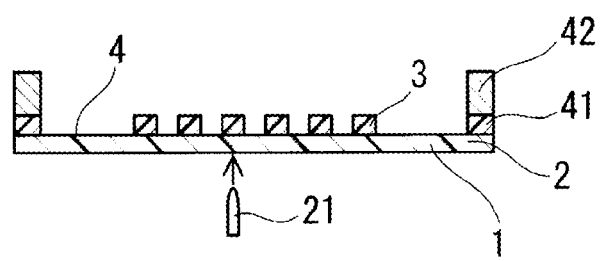
FIG. 7B is a cross-sectional view schematically showing a cross-section B-B of FIG. 7A.

A specific embodiment of pickup is not limited as long as the substrate sheet 2 is pushed up at the time of pickup. FIGS. 7A and 7B show an exemplary specific embodiment of pickup. FIG. 7B shows a cross-section B-B of FIG. 7A. The member supplying sheet 1 of FIGS. 7A and 7B is supplied to a pushup-pickup device in a state where the member supplying sheet 1 is fixed to a dicing ring (wafer ring) 42. The member supplying sheet 1 of FIGS. 7A and 7B is fixed to a dicing ring 42 using a double-sided adhesive tape 41. However, the methods for supplying and fixing the member supplying sheet 1 are not limited to the above examples.

In an example shown in FIG. 4A, two or more protective cover members 3 are placed on the substrate sheet 2. The number of the protective cover members 3 placed on the substrate sheet 2 may be one.

In the example shown in FIG. 4A, two or more protective cover members 3 are regularly placed on the substrate sheet 2. More specifically, when viewed perpendicular to the surface 4, the protective cover members 3 are placed such that a center of each protective cover member 3 is at an intersection (lattice point) of a rectangular lattice. However, the arrangement of the regularly placed protective cover members 3 is not limited to the above example. The protective cover members 3 may be regularly placed such that the center of each protective cover member 3 is at an intersection of any of various lattices such as a square lattice, an orthorhombic lattice, or a rhombic lattice. However, the embodiment of placing the protective cover members 3 is not limited to the above examples. For example, the protective cover members 3 may be placed in a staggered pattern when viewed perpendicular to the surface 4. The center of the protective cover member 3 can be determined as a center of gravity of the shape of the member 3 when viewed perpendicular to the surface 4.

The material of the substrate sheet 2 is typically a resin. Examples of the resin include polyolefins such as polyethylene and polypropylene, polyvinyl chloride, and polyurethane. However, the material of the substrate sheet 2 is not limited to the above examples as long as the substrate sheet 2 satisfies the property A and the property B. The substrate sheet 2 may be a single layer, or may have a laminate structure including two or more layers.

The surface 4 being a placement face of the substrate sheet 2 where the protective cover member 3 is placed may be a release treatment surface subjected to release treatment or may be a release treatment surface treated with silicone or fluorosilicone. In these cases, the surface 4 can have a further decreased peel force. The release treatment can be performed by a known method. As the silicone and the fluorosilicone used in the release treatment can be used, for example, those disclosed in JP 1657446 B2 and JP 1558229 B2.

The thickness of the substrate sheet 2 is, for example, 1 to 200 μm.

The substrate sheet 2 of FIG. 4A is in the form of a sheet having a rectangular shape. The substrate sheet 2 of FIG. 7A is in the form of a sheet having a circular shape. The shape of the substrate sheet 2 in the form of a sheet is not limited to the above example, and may be a polygon such as a square or a rectangle, a circle, an ellipse, or the like. A corner of the polygon may be rounded. When the substrate sheet 2 is in the form of a sheet, the member supplying sheet 1 can be distributed and used in the form of a sheet. The substrate sheet 2 may be in the form of a strip, and, in this case, the member supplying sheet 1 is also in the form of a strip. The member supplying sheet 1 in the form of a strip can be distributed in the form of a wound body wound around a winding core.

The protective membrane 11 may be gas-impermeable in a thickness direction thereof or may have gas permeability in the thickness direction. With the protective membrane 11 having gas permeability in the thickness direction, the protective cover member 3 placed on the object 33 allows passage of gas through the opening 35 of the object 33 while preventing a foreign matter from entering the opening 35. By allowing passage of gas, for example, adjustment of pressure and reduction of pressure variability can be achieved through the opening 35 of the object 33. An example of reducing pressure variability is shown hereinafter. Sometimes, a heat treatment such as reflow soldering is performed with a semiconductor device placed to cover one opening of a through hole provided in a circuit board. With the protective cover member 3 placed to cover the other opening of the through hole, entrance of a foreign matter into the semiconductor device through the through hole can be reduced in the heat treatment. The protective membrane 11 having gas permeability in the thickness direction reduces a heat-induced increase in pressure in the through hole and can thereby prevent damage to the semiconductor device by the pressure increase. Examples of the semiconductor device include MEMSs such as microphones, pressure sensors, and acceleration sensors. These devices have an opening allowing gas or sound to pass therethrough, and can be placed on a circuit board such that the opening faces a through hole provided in the circuit board. The protective cover member 3 may be placed on a manufactured semiconductor device such that the protective cover member 3 covers an opening of the manufactured semiconductor device. In the case where the protective membrane 11 has gas permeability in the thickness direction, the protective cover member 3 placed can function, for example, as a gas-permeable member allowing passage of gas through the opening 35 while preventing entrance of a foreign matter through the opening 35 and/or a sound-permeable member allowing passage of sound through the opening 35 while preventing entrance of a foreign matter through the opening 35. It should be noted that even in the case where the protective membrane 11 is gas-impermeable in the thickness direction, it is possible to transmit sound by vibration of the protective membrane 11, and therefore the protective cover member 3 placed functions as a sound-permeable member.

The protective membrane 11 having gas permeability in the thickness direction has a gas permeability of, for example, 100 sec/100 mL or less as expressed in terms of an air permeability (Gurley air permeability) obtained according to Method B (Gurley method) of gas permeability measurement specified in JIS L 1096.

The protective membrane 11 may be waterproof and/or dustproof. The protective cover member 3 including the protective membrane 11 being waterproof can function, for example, as a waterproof gas-permeable member and/or a waterproof sound-permeable member after placed on the object 33. The protective membrane 11 being waterproof has a water entry pressure of, for example, 5 kPa or more. The water entry pressure is determined according to Method A (low water pressure method) or Method B (high water pressure method) of the water resistance test defined in JIS L 1092.

Examples of the material forming the protective membrane 11 include a metal, a resin, and a composite material thereof.

Examples of the resin that can form the protective membrane 11 include polyolefins such as polyethylene and polypropylene, polyesters such as polyethylene terephthalate (PET), silicone resins, polycarbonates, polyimides, polyamide-imides, polyphenylene sulfide, polyetheretherketone (PEEK), and fluorine resins. Examples of the fluorine resins include polytetrafluoroethylene (PTFE), tetrafluoroethylene-perfluoroalkyl vinyl ether copolymer (PFA), tetrafluoroethylene-hexafluoropropylene copolymer (FEP), and tetrafluoroethylene-ethylene copolymer (ETFE). However, the resin is not limited to the above examples.

Examples of the metal that can form the protective membrane 11 include stainless steel and aluminum.

The protective membrane 11 may be formed of a heat-resistant material. In this case, applicability of the protective membrane to treatment, such as reflow soldering, under high temperatures can be ensured depending on the materials of the other layers of the protective cover member 3. Examples of the heat-resistant material include a metal and a heat-resistant resin. Typical heat-resistant resins have a melting point of 150° C. or higher. The heat-resistant resin may have a melting point of 160° C. or higher, 200° C. or higher, 250° C. or higher, 260° C. or higher, or even 300° C. or higher. Examples of the heat-resistant resin include a silicone resin, a polyimide, a polyamide-imide, polyphenylene sulfide, PEEK, and a fluorine resin. The fluorine resin may be PTFE. PTFE is excellent particularly in heat resistance.

The protective membrane 11 having gas permeability in the thickness direction may include a stretched porous membrane. The stretched porous membrane may be a stretched porous fluorine resin membrane, and particularly a stretched porous PTFE membrane. The stretched porous PTFE membrane is normally formed by stretching a cast membrane or a paste extrusion containing PTFE particles.

The stretched porous PTFE membrane is formed of fine PTFE fibrils, and can have a node in which PTFE is more highly aggregated than in the fibrils. With the stretched porous PTFE membrane, it is possible to achieve both a high capability of preventing entrance of a foreign matter and a high gas permeability. A known stretched porous membrane can be used as the protective membrane 11.

The protective membrane 11 having gas permeability in the thickness direction may include a perforated membrane in which a plurality of through holes connecting both principal surfaces of the membrane are formed. The perforated membrane may be a membrane formed by providing a plurality of through holes to an original membrane, such as an imperforate membrane, having a non-porous matrix structure. The perforated membrane may have no other ventilation paths in the thickness direction than the plurality of through holes. The through hole may extend in the thickness direction of the perforated membrane or may be a straight hole linearly extending in the thickness direction. An opening of the through hole may have the shape of a circle or an ellipse when viewed perpendicular to a principal surface of the perforated membrane. The perforated membrane can be formed, for example, by laser processing of the original membrane or by ion beam irradiation of the original membrane and subsequent perforation of the resulting membrane by chemical etching.

The protective membrane 11 having gas permeability in the thickness direction may include a non-woven fabric, a woven fabric, a mesh, or a net.

The protective membrane 11 is not limited to the above example.

The protective membrane 11 of FIG. 4B has the shape of a rectangle when viewed perpendicular to the principal surface of the protective membrane 11. However, the shape of the protective membrane 11 is not limited to the above example, and may be, for example, a polygon including a square and a rectangle, a circle, and an ellipse when viewed perpendicular to the principal surface of the protective membrane 11. The polygon may be a regular polygon. A corner of the polygon may be rounded.

The thickness of the protective membrane 11 is, for example, 1 to 100 μm.

The protective membrane 11 has an area of, for example, 175 $mm^2$ or less. The protective cover member 3 including the protective membrane 11 having an area in the above range is, for example, suitable for being placed on a circuit board or MEMS that normally has a small-diameter opening. The lower limit of the area of the protective membrane 11 is, for example, 0.20 $mm^2$ or more. However, the area of the protective membrane 11 may be larger depending on the type of an object where the protective cover member 3 is placed.

The adhesive layer 12 is, for example, a layer to which an adhesive is applied. Examples of the adhesive include an acrylic adhesive, a silicone adhesive, a urethane adhesive, an epoxy adhesive, and a rubber adhesive. The adhesive may be heat curable. One example of a heat curable adhesive is an adhesive formed by mixing a thermosetting resin, such as an epoxy resin or a phenolic resin, in an acrylic resin. It is preferred that an acrylic or silicone adhesive, which is highly heat resistant, particularly a silicone adhesive, be selected in the case where use of the protective cover member 3 under high temperatures needs to be taken into account. In the above case, a heat curable adhesive may be chosen.

Examples of the acrylic adhesive include adhesives disclosed in JP 2005-105212 A. Examples of the silicone adhesive include adhesives (including those disclosed as Comparative Examples) disclosed in JP 2003-313516 A.

The adhesive layer 12 may be a single layer, or may have a laminate structure including two or more adhesive layers.

The adhesive layer 12 of FIG. 4B is joined to the protective membrane 11. However, an additional layer may be placed between the protective membrane 11 and the adhesive layer 12.

Figure 8:
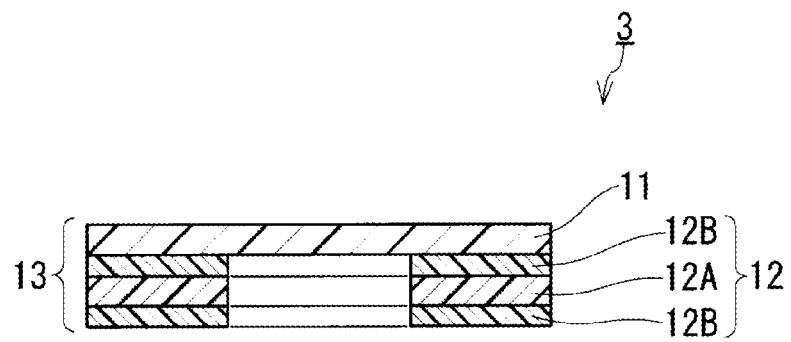
FIG. 8 is a cross-sectional view schematically showing an example of a protective cover member supplied using the member supplying sheet of the present invention.

The adhesive layer 12 may be a double-sided adhesive tape (refer to FIG. 8). The adhesive layer 12 of FIG. 8 is a substrate-including tape including a substrate 12A and an adhesive layer 12B provided on each of two surfaces of the substrate 12A. Examples of the adhesive layer 12B are the same as those of the adhesive layer 12. The adhesives included in the pair of adhesive layers 12B may be the same or different. For example, one of the adhesive layers 12B may include an acrylic adhesive, while the other adhesive layer 12B includes a silicone adhesive. The double-sided adhesive tape may be a substrate-less tape not including the substrate 12A.

Figure 9A:
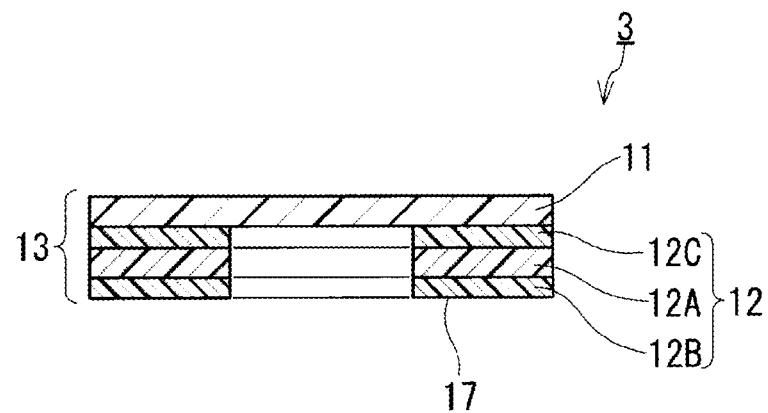
FIG. 9A is a cross-sectional view schematically showing an example of a protective cover member supplied using the member supplying sheet of the present invention.
Figure 9B:
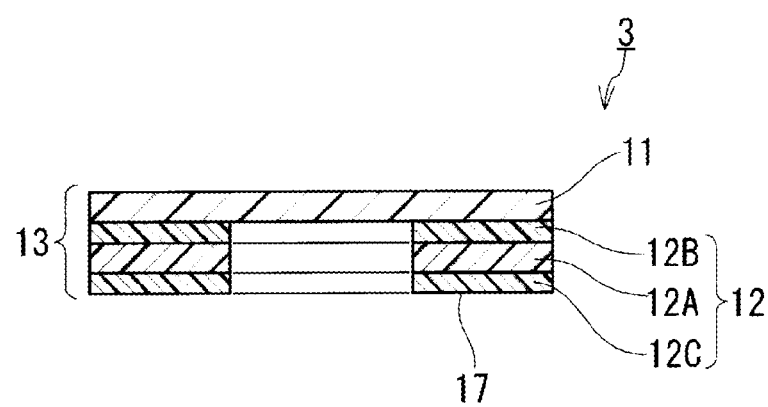
FIG. 9B is a cross-sectional view schematically showing an example of a protective cover member supplied using the member supplying sheet of the present invention.

The adhesive layer 12 may be a combination of a plurality of adhesive layers. The adhesive layer 12 may be a laminate structure formed of a combination of a single-sided adhesive tape including the substrate 12A and the adhesive layer 12B provided on one of the surfaces of the substrate 12A, and an adhesive layer 12C (refer to FIGS. 9A and 9B). In the example of FIG. 9A, the adhesive layer 12B of the single-sided adhesive tape forms a joining surface 17 to be joined to the surface 4 of the substrate sheet 2. In the example of FIG. 9B, the adhesive layer 12C forms the joining surface 17 to be joined to the surface 4. The adhesive layer 12C may be a layer to which an adhesive is applied, or may be a double-sided adhesive tape.

The joining surface 17 of the adhesive layer 12 is preferably formed of an acrylic adhesive or a silicone adhesive, the joining surface 17 being configured to be joined to the surface 4. When the joining surface 17 is formed of an acrylic adhesive, the release treatment of the surface 4 is preferably a treatment with silicone (in other words, the surface 4 is preferably a release treatment surface treated with silicone). When the joining surface 17 is formed of a silicone adhesive, the release treatment of the surface 4 is preferably a treatment with fluorosilicone (in other words, the surface 4 is preferably a release treatment surface treated with fluorosilicone). When the joining surface 17 is formed of a heat-curable adhesive formed by mixing a thermosetting resin, such as an epoxy resin, in an acrylic resin, the release treatment of the surface 4 is preferably a treatment with silicone.

The substrate 12A of the adhesive tape is, for example, a film, a non-woven fabric, or a foam made of a resin, a metal, or a composite material thereof. The substrate 12A of the adhesive tape may be formed of a heat-resistant material. In this case, the protective cover member 3 can be used more reliably at high temperatures depending on the materials of the other layers of the protective cover member 3. Specific examples of the heat-resistant material are those described above in the description of the protective membrane 11.

Figure 10:
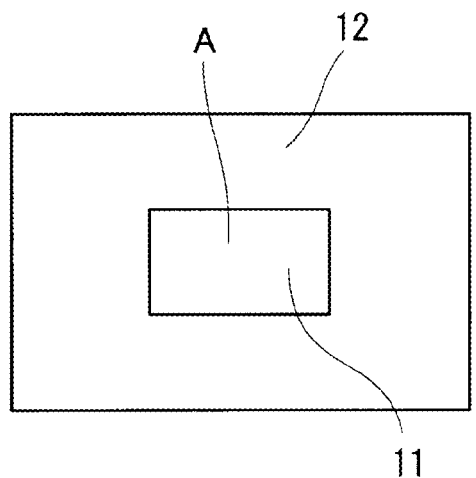
FIG. 10 is a plan view schematically showing an example of a protective cover member supplied using the member supplying sheet of the present invention.

When viewed perpendicular to a principal surface of the protective membrane 11, the adhesive layer 12 of FIG. 4B is placed on a limited region of the principal surface. The adhesive layer 12 of FIG. 4B is in the shape of a peripheral portion of the protective membrane 11 when viewed perpendicular to the principal surface of the protective membrane 11. Specifically, the adhesive layer 12 of FIG. 4B is in the shape of a frame when viewed perpendicular to the principal surface of the protective membrane 11 (refer to FIG. 10). It should be noted that FIG. 10 is a plan view of the protective cover member 3 of FIGS. 4A and 4B viewed from the adhesive layer 12 side. In this case, more favorable passage of gas and/or sound can be achieved in a region A, where the adhesive layer 12 is not formed, of the protective membrane 11 than in a region where the adhesive layer 12 is formed. However, the shape of the adhesive layer 12 is not limited to the above example.

The area of the region A of the protective membrane 11 is, for example, 20 mm² or less. The protective cover member 3 including the region A having an area in this range is, for example, suitable for being placed on a circuit board or MEMS that normally has a small-diameter opening. The lower limit of the area of the region A is, for example, 0.008 mm² or more. However, the area of the region A may be larger depending on the type of the object 33 where the protective cover member 3 is placed.

The thickness of the adhesive layer 12 is, for example, 10 to 200 μm.

The laminate 13 of the protective cover member 3 may have a layer other than the protective membrane 11 and the adhesive layer 12. FIG. 11 to FIG. 14 show examples of the protective cover member 3 including an additional layer.

Figure 11:
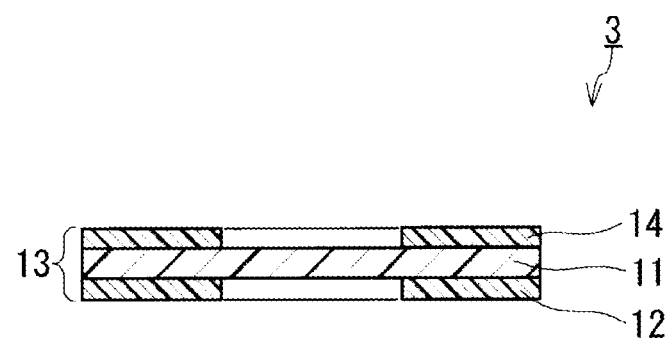
FIG. 11 is a cross-sectional view schematically showing an example of a protective cover member supplied using the member supplying sheet of the present invention.

The laminate 13 of FIG. 11 includes an adhesive layer 14 placed such that the adhesive layer 14 and the adhesive layer 12 sandwich the protective membrane 11. In this case, an additional layer can be placed on the adhesive layer 14, or the adhesive layer 14 can be joined to, for example, an optional member and/or surface when the protective cover member 3 is placed on the object 33. The protective cover member 3 may be placed such that the adhesive layer 14, instead of the adhesive layer 12, is in contact with the face 34 of the object 33. The adhesive layer 14 of FIG. 11 is joined to the protective membrane 11. However, an additional layer may be placed between the protective membrane 11 and the adhesive layer 14. The protective cover member 3 of FIG. 11 is the same as the protective cover member 3 of FIG. 4B, except that the protective cover member 3 of FIG. 11 further includes the adhesive layer 14.

The adhesive layer 14 can have the same configuration as that of the adhesive layer 12. For example, the adhesive layer 14 may be a double-sided adhesive tape (refer to FIG. 12). The adhesive layer 14 of FIG. 12 is a substrate-including tape including a substrate 14A and an adhesive layer 14B provided on each of two surfaces of the substrate 14A.

Figure 12:
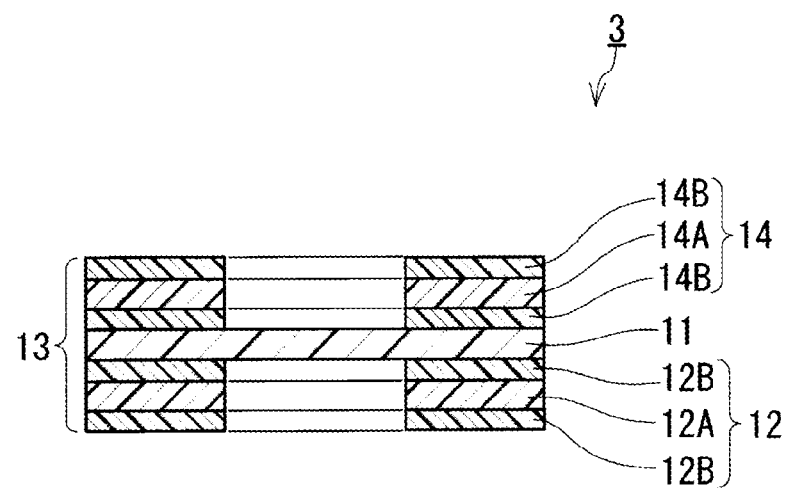
FIG. 12 is a cross-sectional view schematically showing an example of a protective cover member supplied using the member supplying sheet of the present invention.

The adhesive layer 14 of each of FIGS. 11 and 12 has the same shape as that of the adhesive layer 12. In this case, more favorable passage of gas and/or sound can be achieved in a region B, where the adhesive layer 14 is not formed, of the protective membrane 11 than in a region where the adhesive layer 14 is formed. However, the shape of the adhesive layer 14 is not limited to the above example. The area of the region B can be in the same range of the area of the region A. The area of the region B may be equal to that of the region A.

Figure 13:
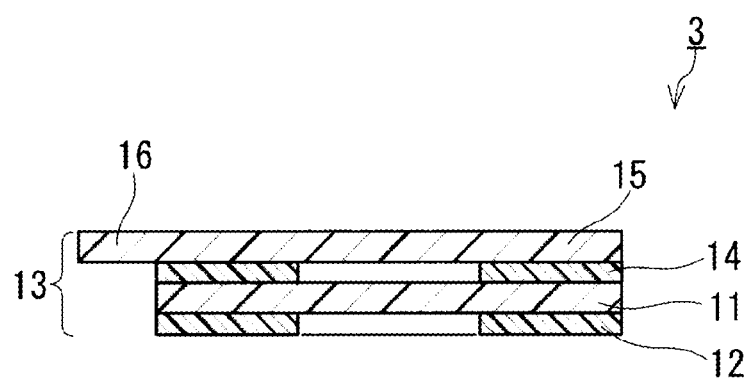
FIG. 13 is a cross-sectional view schematically showing an example of a protective cover member supplied using the member supplying sheet of the present invention.

The laminate 13 of FIG. 13 further includes a cover film 15 positioned opposite to the adhesive layer 12 with respect to the protective membrane 11 and covering the protective membrane 11. The cover film 15 is placed on the adhesive layer 14. An additional layer may be placed between the adhesive layer 14 and the cover film 15. The cover film 15 functions as a protective film protecting the protective membrane 11 until the protective cover member 3 is placed on the object 33, for example. The cover film 15 may be peeled off after the protective cover member 3 is placed on the object 33. The cover film 15 may cover the entire protective membrane 11 or may cover a part of the protective membrane 11 when viewed perpendicular to the principal surface of the protective membrane 11.

The cover film 15 of FIG. 13 has a tab 16 protruding outward with respect to a perimeter of the protective membrane 11 when viewed perpendicular to the principal surface of the protective membrane 11. The tab 16 can be used to peel the cover film 15 off. However, the shape of the cover film 15 is not limited to the above examples.

Examples of the material forming the cover film 15 include a metal, a resin, and a composite material thereof. Specific examples of the material that can form the cover film 15 are the same as the specific examples of the material that can form the substrate 12A.

The thickness of the cover film 15 is, for example, 200 to 1000 μm.

Figure 14:
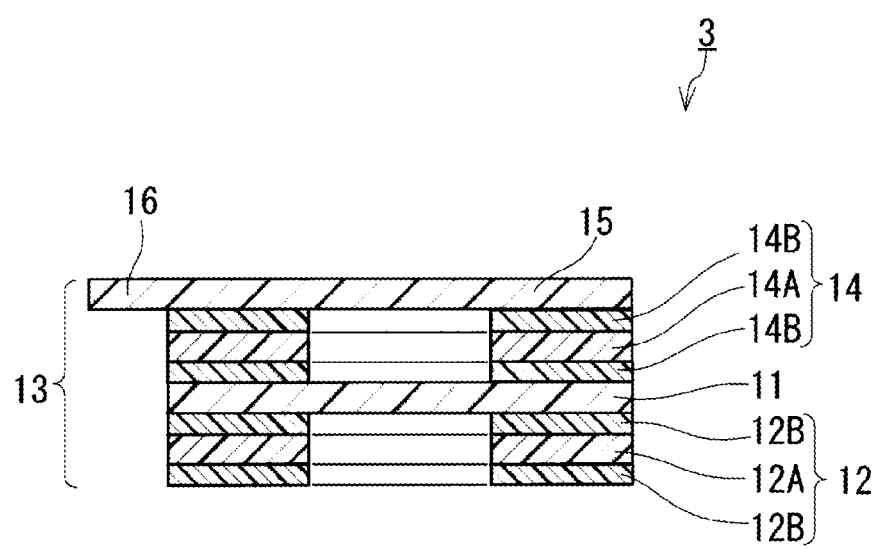
FIG. 14 is a cross-sectional view schematically showing an example of a protective cover member supplied using the member supplying sheet of the present invention.

FIG. 14 shows another example of the protective cover member 3 further including the cover film 15. The protective cover member 3 of FIG. 14 is the same as the protective cover member 3 of FIG. 13, except that the adhesive layer 12 and the adhesive layer 14 are double-sided adhesive tapes.

The protective cover member 3 of FIGS. 4A and 4B has the shape of a rectangle when viewed perpendicular to the principal surface of the protective membrane 11. However, the shape of the protective cover member 3 is not limited to this example. The shape of the protective cover member 3 may be a polygon including a square and a rectangle, a circle, and an ellipse when viewed perpendicular to the principal surface of the protective membrane 11. The polygon may be a regular polygon. A corner of the polygon may be rounded.

The protective cover member 3 has an area (the area viewed perpendicular to the principal surface of the protective membrane 11) of, for example, 175 mm² or less. The protective cover member 3 having an area in the above range is, for example, suitable for being placed on a circuit board or MEMS that normally has a small-diameter opening. The lower limit of the area of the protective cover member 3 is, for example, 0.20 mm² or more. However, the area of the protective cover member 3 may be larger depending on the type of an object where the protective cover member 3 is placed. The smaller the area of the protective cover member 3 is, the more difficult it is to pick up the protective cover member 3. Therefore, the effects of the present invention are particularly significant when the area of the protective cover member 3 is in the above range.

Examples of the object 33 where the protective cover member 3 is to be placed include semiconductor devices, such as MEMSs, and circuit boards. In other words, the protective cover member 3 may be a member for a semiconductor device, circuit board, or MEMS being the object 33. The MEMS may be a non-encapsulated device having a ventilation hole on a surface of its package. Examples of the non-encapsulated MEMS include various sensors detecting the gas pressure, humidity, gas, air flow, and the like and electroacoustic transducer elements such as speakers and microphones.

Moreover, examples of the object 33 are not limited to manufactured semiconductor devices and manufactured circuit boards, and may be intermediate products of such devices or boards in a manufacturing step. In this case, the protective cover member 3 can protect the intermediate product in the manufacturing step. Examples of the manufacturing step include a reflow soldering step, dicing step, bonding step, and mounting step. However, the object 33 is not limited to the above examples.

A face 34 of the object 33 where the protective cover member 3 can be placed is typically a surface of the object 33. The face 34 may be a flat face or a curved face. The opening 35 of the object 33 may be an opening of a recessed portion or an opening of a through hole.

The object 33 having the face 34 where the protective cover member 3 is placed can be manufactured using the member supplying sheet 1. The present disclosure includes a method for manufacturing a protective cover member-attached object by supplying the member supplying sheet 1. Where the member supplying sheet 1 is supplied is typically a pushup-pickup device.

The member supplying sheet 1 can be manufactured by placing the protective cover member 3 on the surface 4 of the substrate sheet 2. The protective cover member 3 can be manufactured, for example, by laminating the protective membrane 11 and the adhesive layer 12.

EXAMPLES

Hereinafter, the present invention will be described more specifically by way of examples. The present invention is not limited to the following examples.

First, evaluation methods of properties of substrate sheets and a pickup property of protective cover members of member supplying sheets will be described.

[10% Tensile Stress and 10% Modulus]

10% tensile stress and 10% modulus of a substrate sheet were determined by a tensile test using a tensile tester (AG-I manufactured by Shimadzu Corporation). The evaluation was performed in the longitudinal direction (MD) and the width direction (TD) of a substrate sheet in the form of a strip. A test piece had a shape of a dumbbell No. 3 (gauge length: 20 mm) defined in JIS K 6251: 1993. Measurement conditions were as follows: measurement temperature: 25° C.; measurement humidity: 50% RH, initial chuck-to-chuck distance: 35 mm; tensile speed: 200 mm/min.

[Peel Force of Placement Face]

The peel force of a placement face of a substrate sheet where a protective cover member is placed was determined by the above method. AS-42PI50 manufactured by Nitto Denko Corporation was used as a double-sided adhesive tape. A portion where the test piece and the double-sided adhesive tape were adhered had a length of 150 mm. A peel length for which the adhesive force is measured was 120 mm. The test was performed at a temperature of 20° C. and a humidity of 50% RH.

[Pickup Property]

Figure 15A:
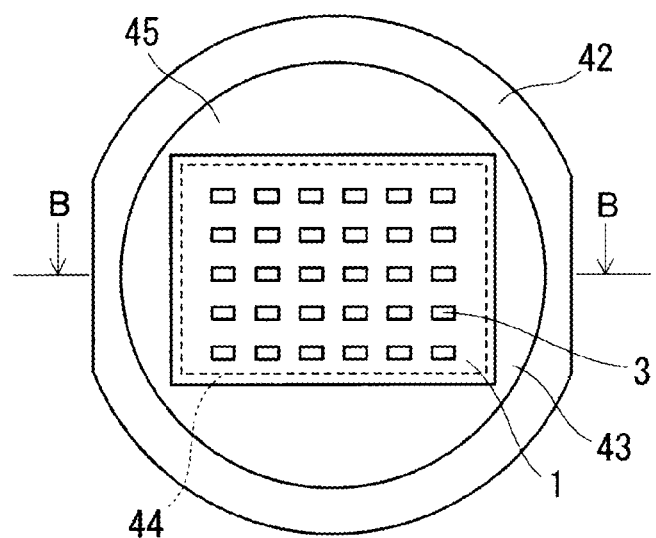
FIG. 15A is a schematic plan view illustrating an evaluation test performed in examples for a pickup property of a member supplying sheet.
Figure 15B:
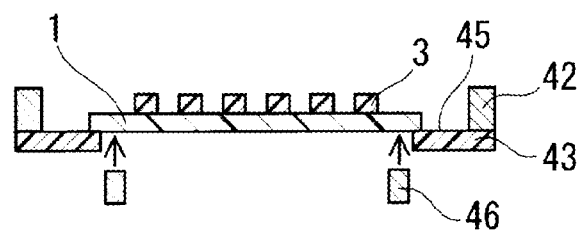
FIG. 15B is a cross-sectional view schematically showing a cross-section B-B of FIG. 15A.

The pickup property of a member supplying sheet was evaluated in the following manner. A member supplying sheet produced was placed on a mounter of DB830plus+, which is a pushup-pickup device, manufactured by FASFORD TECHNOLOGY CO., LTD. The mounter has a pair of push-up indenters (a needle having a diameter of 1.5 mm; the curvature of the tip: 0.022 mm), and can push up individual protective cover members on the substrate sheet at a given pushup amount d and a given pushup rate according to a program. The member supplying sheet was placed in the following manner using the dicing ring 42 (refer to FIGS. 15A and 15B. FIG. 15B shows a cross-section B-B of FIG. 15A). A single-sided adhesive sheet 43 was adhered to one main surface of the dicing ring 42 such that their outer perimeters were aligned. An opening 44 having the shape of a rectangle (100 mm×60 mm) when viewed perpendicular to a principal surface of the single-sided adhesive sheet 43 was provided at a central portion of the single-sided adhesive sheet 43. Next, the member supplying sheet 1 to be evaluated was placed on an adhesive surface 45 of the single-sided adhesive sheet 43 to cover the opening 44 and was fixed to the dicing ring 42. The member supplying sheet 1 to be evaluated was placed such that a long side of the member supplying sheet 1 and that of the opening 44 are parallel to each other and the distance between a perimeter of the member supplying sheet 1 and that of the opening 44 is constant along the entire perimeters thereof. Then, the dicing ring 42 to which the member supplying sheet 1 was fixed was placed on the mounter.

Figure 16:
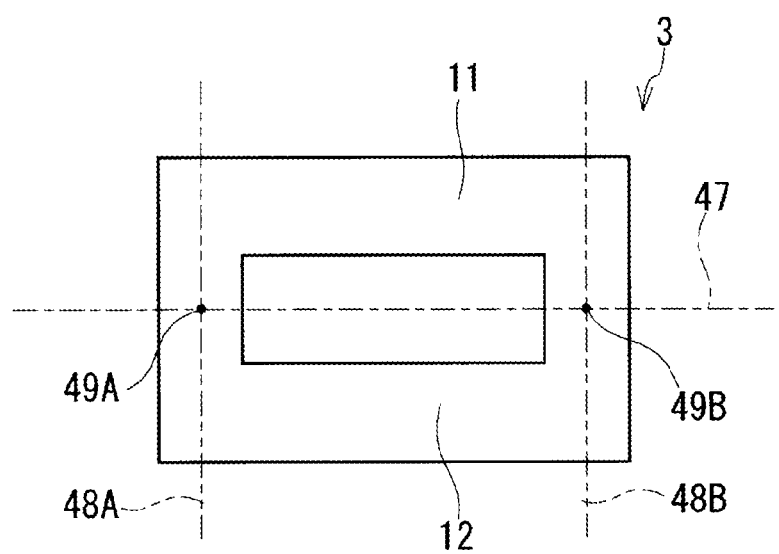
FIG. 16 is a schematic diagram illustrating an evaluation test performed in examples for a pickup property of a member supplying sheet.

Next, several sets of 3 to 10 protective cover members randomly selected from 100 protective cover members placed on the one member supplying sheet were made. An attempt to pick up the protective cover members in each set by pushing up the members one by one in sequence was made. The pushup amount d started from 50 μm and was increased each set (refer to Tables 1A and 1B). The pushup rate was 0.3 mm/sec (in Comparative Examples, the pushup rate was 0.3 mm/sec and 5 mm/sec). Pushup positions corresponded to two intersections 49A and 49B of a center line 47 extending in a long side direction of the rectangular protective cover member 3 and center lines 48A and 48B extending in a short side direction of the adhesive layer 12 having the shape of the peripheral portion of the protective membrane 11 (refer to FIG. 16). Pushup was performed in a state where the single-sided adhesive sheet 43 and the member supplying sheet 1 were lifted about 3 mm by another dicing ring 46 whose outer diameter was smaller than an inner diameter of the dicing ring 42 to which the member supplying sheet 1 was fixed (refer to FIG. 15B). As the dicing ring 46 was selected a dicing ring that did not overlap the protective cover member 3 when viewed perpendicular to a principal surface of the member supplying sheet 1. A suction nozzle was used for pickup, and suction by the suction nozzle started at the moment when the pushup amount d reached a maximum. A suction time was 100 millisecond (pushup rate: 0.3 mm/sec) or 1000 millisecond (pushup rate: 5 mm/sec). The pickup property was evaluated by a pickup rate A/B, which is a rate between the number B of protective cover members in one set and the number A of successfully picked up protective cover members in the one set. The larger the pickup rate A/B is, the better the pickup property is.

Manufacture Example 1: Production of Protective Cover Member A

A stretched porous PTFE membrane (NTF663AP manufactured by Nitto Denko Corporation; thickness: 10 μm) was prepared as the protective membrane 11. The stretched porous PTFE membrane had the shape of a 3.2 mm×2.4 mm rectangle. Next, a double-sided adhesive tape (AS-42PI50 manufactured by Nitto Denko Corporation) in a frame shape was adhered as the adhesive layer 12 to one principal surface of the protective membrane 11. The outer shape of the adhesive layer 12 was a 3.2 mm×2.4 mm rectangle, the inner shape thereof was a 2.0 mm×1.2 mm rectangle, and the width was constant along the entire perimeter. The protective membrane 11 and the adhesive layer 12 were adhered such that outer perimeters thereof were aligned. The adhesive layers 12B of the double-sided adhesive tape were each an acrylic adhesive layer. Next, a double-sided adhesive tape same as the adhesive layer 12 was adhered as the adhesive layer 14 to the other principal surface of the protective membrane 11. The protective membrane 11 and the adhesive layer 14 were adhered such that outer perimeters thereof were aligned. Next, a PET film (PET75×1-K6-ASI manufactured by NIPPA CORPORATION; thickness: 75 µm) was adhered as the cover film 15 onto the adhesive layer 14. The cover film 15 has the same shape as that of the adhesive layer 14, and the cover film 15 and the adhesive layer 14 were adhered such that outer perimeters thereof were aligned. A protective cover member A being rectangular when viewed from the principal surface of the protective membrane 11 was obtained in this manner.

Manufacture Example 2: Production of Protective Cover Member B

A protective cover member B was obtained in the same manner as in Manufacture Example 1, except that a laminate structure formed of a double-sided adhesive tape (No. 585 manufactured by Nitto Denko Corporation) and a single-sided adhesive tape (No. 360UL manufactured by Nitto Denko Corporation) was used as the adhesive layer 12. The double-sided adhesive tape and the single-sided adhesive tape were used such that an adhesive layer of the double-sided adhesive tape was in contact with the protective membrane 11 and an adhesive layer of the single-sided adhesive tape was in contact with the joining surface 17 to be joined to the substrate sheet 2. The adhesive layer of the single-sided adhesive tape was a silicone adhesive layer.

Example 1

A polyethylene sheet (NS-100PEG manufactured by FUJI Corporation; a 120 mm×80 mm rectangle; thickness: 100 µm) was prepared as the substrate sheet 2. The direction in which a long side of the rectangle sheet extended coincided with the MD (longitudinal direction) of a strip-shaped sheet from which the rectangle sheet was cut out (the same applies to other examples). One side of the substrate sheet 2 had been subjected to a release treatment with silicone. Next, 100 (10 columns×10 rows) protective cover members A were placed on a release treatment surface of the substrate sheet 2. The 100 protective cover members A were placed such that when viewed from a placement face of the substrate sheet 2 where the protective cover members A were placed, the center of each protective cover member A was located at an intersection of a rectangular lattice (long side: 6.0 mm; short side: 5.0 mm) and a long side of each protective cover member 3 and a long side of the substrate sheet 2 were in parallel. A member supplying sheet of Example 1 was obtained in this manner.

Example 2

A member supplying sheet of Example 2 was obtained in the same manner as in Example 1, except that a different polyethylene sheet (100RL-02 manufactured by Oji F-Tex Co., Ltd.; a 120 mm×80 mm rectangle; thickness: 100 µm) was used as the substrate sheet 2. One side of the sheet had been subjected to a release treatment with silicone, the side being a placement face where the protective cover member A was placed.

Example 3

A polyethylene sheet as used in Example 2 was used as the substrate sheet 2 after a non-release-treated surface thereof was subjected to a release treatment with fluorosilicone. The release treatment was performed by applying a solution (concentration: 3 mass %) of fluorosilicone (X70-201SN manufactured by Shin-Etsu Chemical Co., Ltd.) to the non-release-treated surface and heating the surface at 150° C. for 1 minute. Next, 100 (10 columns×10 rows) protective cover members B were placed on the release treatment surface of the substrate sheet 2 treated with fluorosilicone. The protective cover members B were placed in the same manner as the protective cover members A of Example 1. A member supplying sheet of Example 3 was obtained in this manner.

Example 4

A member supplying sheet of Example 4 was obtained in the same manner as in Example 1, except that a cast polypropylene sheet (100RLW-05 manufactured by Oji F-Tex Co., Ltd.; a 120 mm×80 mm rectangle; thickness: 100 µm) was used as the substrate sheet 2. One side of the sheet had been subjected to a release treatment with silicone, the side being a placement face where the protective cover member A is placed.

Comparative Example 1

A member supplying sheet of Comparative Example 1 was obtained in the same manner as in Example 1, except that a PET sheet (RT-50A manufactured by Nitto Denko Corporation; a 120 mm×80 mm rectangle; thickness: 100 µm) was used as the substrate sheet. One side of the sheet had been subjected to a release treatment with fluorosilicone, the side being a placement face where the protective cover member A is placed.

Comparative Example 2

A member supplying sheet of Comparative Example 2 was obtained in the same manner as in Example 2, except that the protective cover member B was used instead of the protective cover member A.

Comparative Example 3

A member supplying sheet of Comparative Example 3 was obtained in the same manner as in Example 2, except that the protective cover member A was placed on a non-release-treated surface of a substrate sheet as used in Example 2.

Comparative Example 4

A member supplying sheet of Comparative Example 4 was obtained in the same manner as in Example 1, except that a PTFE sheet (No. 900 manufactured by Nitto Denko Corporation; a 120 mm×80 mm rectangle; thickness: 80 µm) was used as the substrate sheet. This PTFE sheet had no release treatment surface.

Tables 1A and 1B below show the evaluation results. It should be noted that "-" for "Pickup rates A/B at different pushup amounts d (µm)" in Tables 1A and 1B means that the evaluation was not performed.

TABLE 1A

|  |  | Example 1 | Example 2 | Example 3 | Example 4 |
|---|---|---|---|---|---|
| Protective cover member | Sample | A | A | B | A |
|  | Type of adhesive forming joining surface joined to substrate sheet | Acrylic | Acrylic | Silicone | Acrylic |
| Substrate sheet | Peel treatment of placement face where protective cover member is placed | Silicone | Silicone | Fluorosilicone | Silicone |
|  | 10% tensile stress MD (N/5 mm) | 8.5 | 4.5 | 4.5 | 14.5 |
|  | TD | 9.5 | 5.0 | 5.0 | 13.5 |
|  | 10% modulus MD (MPa) | 17 | 9 | 9 | 29 |
|  | TD | 19 | 10 | 10 | 27 |
|  | Peel force of placement face of protective cover member (N/50 mm) | 0.40 | 0.08 | 0.10 | 0.07 |
| Pickup rates A/B at different pushup amounts d (μm) | Pushup speed (mm/sec) | 0.3 | 0.3 | 0.3 | 0.3 |
|  | d = 50 | 9/9 | 9/9 | 9/9 | — |
|  | d = 100 | 9/9 | 9/9 | 9/9 | 0/4 |
|  | d = 150 | 9/9 | 10/10 | 9/9 | 0/4 |
|  | d = 350 | — | 10/10 | — | 7/9 |
|  | d = 450 | — | — | — | 9/9 |
|  | d = 600 | — | — | — | — |
|  | d = 700 | — | — | — | — |
|  | d = 900 | — | — | — | — |

TABLE 1B

|  |  | Comparative Example 1 | | Comparative Example 2 | | Comparative Example 3 | | Comparative Example 4 | |
|---|---|---|---|---|---|---|---|---|---|
| Protective cover member | Sample | A | | B | | A | | A | |
|  | Type of adhesive forming joining surface joined to substrate sheet | Acrylic | | Silicone | | Acrylic | | Acrylic | |
| Substrate sheet | Peel treatment of placement face where protective cover member is placed | Fluorosilicone | | Silicone | | None | | None | |
|  | 10% tensile stress MD (N/5 mm) | 29.3 | | 4.5 | | 4.5 | | 9.6 | |
|  | TD | 30.5 | | 5.0 | | 5.0 | | 8.4 | |
|  | 10% modulus MD (MPa) | 117 | | 9 | | 9 | | 24 | |
|  | TD | 122 | | 10 | | 10 | | 21 | |
|  | Peel force of placement face of protective cover member (N/50 mm) | 0.07 | | 3.8 | | 2.1 | | 1.5 | |
| Pickup rates A/B at different pushup amounts d (μm) | Pushup speed (mm/sec) | 0.3 | 5 | 0.3 | 5 | 0.3 | 5 | 0.3 | 5 |
|  | d = 50 | — | — | — | — | — | — | — | — |
|  | d = 100 | 0/5 | 0/5 | — | — | — | — | — | — |
|  | d = 150 | 0/5 | 0/5 | — | 0/5 | 0/4 | — | — | — |
|  | d = 350 | 3/5 | 0/5 | — | 0/5 | 0/4 | — | — | — |
|  | d = 450 | — | 0/5 | — | — | 2/8 | — | — | 0/5 |
|  | d = 600 | — | 0/5 | — | — | 4/5 | — | — | 0/5 |
|  | d = 700 | — | — | — | 0/5 | — | 2/6 | 6/9 | 7/9 |
|  | d = 900 | — | — | — | 0/5 | — | 1/3 | 9/9 | 9/9 |

As shown in Tables 1A and 1B, good pickup performance was able to be achieved in Examples even when the pushup amount d was small.

INDUSTRIAL APPLICABILITY

The member supplying sheet of the present invention can be used, for example, to supply a protective cover member to a pushup-pickup device.

The invention claimed is:

1. A member supplying sheet, the member supplying sheet being for protective cover member supply and comprising:
   one or more protective cover members each configured to be placed on a face of an object to prevent a foreign matter from entering an opening of the face; and
   a substrate sheet having a surface where the one or more protective cover members are placed, wherein
   the protective cover member comprises a laminate including: a protective membrane having a shape configured to cover the opening when the protective cover member is placed on the face; and an adhesive layer,
   wherein the protective membrane has gas permeability in a thickness direction of the protective membrane, the gas permeability being 100 sec/100 mL or less as expressed in terms of a Gurley air permeability obtained according to a Gurley Method B of gas permeability measurement specified in JIS L 1096, the protective membrane includes a stretched porous polytetrafluoroethylene membrane, and wherein, in a direction in which the protective membrane and adhesive layer are stacked, opposing side edges of the adhesive layer are aligned with opposing side edges of the protective membrane, the protective cover member is placed on the surface of the substrate sheet via the adhesive layer, and the substrate sheet has the following property A and property B:

A: a tensile stress at 10% stretching in a tensile test is 15 N/5 mm or less in at least one in-plane direction; and B: a peel force of the surface is 0.4 N/50 mm or less, the peel force being evaluated by a peel test in which the substrate sheet adhered to an adhesive tape via the surface is peeled off at 180° with respect to the adhesive tape.

2. The member supplying sheet according to claim 1, wherein a joining surface of the adhesive layer is formed of an acrylic adhesive or a silicone adhesive, the joining surface being configured to be joined to the surface.

3. The member supplying sheet according to claim 1, wherein the surface of the substrate sheet is a release treatment surface treated with silicone or fluorosilicone.

4. The member supplying sheet according to claim 1, wherein a joining surface of the adhesive layer is formed of an acrylic adhesive, the joining surface being configured to be joined to the surface, and the surface of the substrate sheet is a release treatment surface treated with silicone.

5. The member supplying sheet according to claim 1, wherein a joining surface of the adhesive layer is formed of a silicone adhesive, the joining surface being configured to be joined to the surface, and the surface of the substrate sheet is a release treatment surface treated with fluorosilicone.

6. The member supplying sheet according to claim 1, wherein the adhesive layer is a substrate-less double-sided adhesive tape.

7. The member supplying sheet according to claim 1, wherein the protective membrane has an area of 175 mm$^2$ or less.

8. The member supplying sheet according to claim 1, wherein the laminate further includes a cover film positioned opposite to the adhesive layer with respect to the protective membrane and covering the protective membrane.

9. The member supplying sheet according claim 1, wherein the protective cover member is a member for a micro electro mechanical system (MEMS) being the object.

10. The member supplying sheet according to claim 1, being a member supplying sheet for supplying the protective cover member to a pickup device that picks up the protective cover member from the substrate sheet in a state where the substrate sheet is pushed up from a back side of the substrate sheet, the back side being opposite to the surface.

* * * * *